(12) United States Patent
Roffman et al.

(10) Patent No.: US 9,170,434 B2
(45) Date of Patent: *Oct. 27, 2015

(54) TRANSLATING PRESBYOPIC CONTACT LENS

(75) Inventors: Jeffrey H. Roffman, Saint Johns, FL (US); Philippe F. Jubin, Fernandina Beach, FL (US); Edgar V. Menezes, Jacksonville, FL (US); Pierre-Yves Gerligand, Saint Johns, FL (US); Timothy A. Clutterbuck, Jacksonville, FL (US); Khaled A. Chehab, Jacksonville, FL (US)

(73) Assignee: Johnson & Johnson Vision Care, Inc., Jacksonville, FL (US)

( * ) Notice: Subject to any disclaimer, the term of this patent is extended or adjusted under 35 U.S.C. 154(b) by 1041 days.

This patent is subject to a terminal disclaimer.

(21) Appl. No.: 13/243,381

(22) Filed: Sep. 23, 2011

(65) Prior Publication Data

US 2012/0075579 A1    Mar. 29, 2012

Related U.S. Application Data

(60) Provisional application No. 61/386,937, filed on Sep. 27, 2010.

(51) Int. Cl.
G02C 7/04    (2006.01)

(52) U.S. Cl.
CPC .............. G02C 7/041 (2013.01); G02C 7/048 (2013.01)

(58) Field of Classification Search
CPC .......... G02C 7/04; G02C 7/041; G02C 7/042; G02C 7/043; G02C 7/044; G02C 7/045; G02C 7/048

USPC ............ 359/159.02, 159.05, 159.07, 159.16, 359/159.19, 159.22, 159.36

See application file for complete search history.

(56) References Cited

U.S. PATENT DOCUMENTS

| | | | |
|---|---|---|---|
| 3,187,338 A | 6/1965 | Neefe | |
| 4,549,794 A | 10/1985 | Loshaek et al. | |
| 4,573,774 A | 3/1986 | Sitterle | |
| 4,869,587 A | 9/1989 | Breger | |
| 5,057,578 A | 10/1991 | Spinelli | |
| 5,100,226 A * | 3/1992 | Freeman | 351/159.11 |
| 5,314,960 A | 5/1994 | Spinelli et al. | |
| 5,371,147 A | 12/1994 | Spinelli et al. | |
| 5,608,471 A | 3/1997 | Miller | |
| 5,650,838 A | 7/1997 | Roffman et al. | |
| 5,975,694 A | 11/1999 | Vayntraub | |
| 6,109,749 A | 8/2000 | Bernstein | |

(Continued)

FOREIGN PATENT DOCUMENTS

| | | |
|---|---|---|
| EP | 1734398 A2 | 12/2006 |
| GB | 2326950 A | 1/1999 |

(Continued)

OTHER PUBLICATIONS

Report from the Chinese Patent Office for Application No. CN201180004661 4.8.

(Continued)

*Primary Examiner* — Scott J Sugarman

(57) ABSTRACT

Lenses for correcting presbyopia are translating, multifocal contact lenses with pseudotruncations which are asymmetric about the vertical meridian.

25 Claims, 7 Drawing Sheets

(56) References Cited

U.S. PATENT DOCUMENTS

| | | |
|---|---|---|
| 6,540,353 B1 | 4/2003 | Dunn |
| 6,843,563 B2 | 1/2005 | Richardson |
| 7,004,585 B2 | 2/2006 | Lindacher |
| 7,040,757 B2 | 5/2006 | Hall et al. |
| 7,052,132 B2 | 5/2006 | Ezekiel |
| 7,052,133 B2 | 5/2006 | Lindacher et al. |
| 7,216,978 B2 | 5/2007 | Perez et al. |
| 7,430,930 B2 | 10/2008 | Zeller et al. |
| 7,503,652 B2 | 3/2009 | Menezes |
| 7,543,935 B2 | 6/2009 | Ezekiel |
| 2002/0021410 A1 | 2/2002 | Ye et al. |
| 2004/0233382 A1 | 11/2004 | Lindacher et al. |
| 2006/0055884 A1 | 3/2006 | Molinari et al. |
| 2006/0279695 A1 | 12/2006 | Ezekiel |
| 2009/0225273 A1 | 9/2009 | Clutterbuck et al. |
| 2010/0171924 A1 | 7/2010 | Perrin |

FOREIGN PATENT DOCUMENTS

| | | |
|---|---|---|
| JP | 8262377 A | 10/1996 |
| JP | 2005534064 | 11/2005 |
| WO | WO 98/53360 | 11/1998 |
| WO | WO 9853360 A1 | 11/1998 |

OTHER PUBLICATIONS

Report issued on the corresponding Singapore Patent Application No. 201300846-1 dated Nov. 7, 2014.

Written Opinion for PCT/US2011/052954 date of mailing Jan. 16, 2012.

* cited by examiner

TRANSLATING PRESBYOPIC CONTACT LENS

CROSS REFERENCE TO RELATED APPLICATIONS

This is a non-provisional application which claims priority to U.S. Provisional Applications 61/386,937, filed Sep. 27, 2010. The aforementioned application is incorporated in full by reference herein.

BACKGROUND OF THE INVENTION

As people age, their eyes are less able to accommodate, or bend the natural lens, to focus on objects that are relatively near to the observer. This condition is known as presbyopia. Contact lenses can be worn to address presbyopia. In one type of such lenses, distance and near vision regions are concentrically arranged around the geometric center of the lens. Light passing through the optical zone of the lens is concentrated and focused at more than one point in the eye.

In another type of lens, a segmented lens, near and distance vision regions are not concentric about the geometric center of the lens. The wearer of the segmented lenses is able to access the near vision region of the lens because the lens is constructed to allow it to translate, or move vertically relative to the pupil of the wearer's eye. The lens moves vertically when the person wearing the lens shifts their gaze downwardly to read. This upwardly positions the near vision portion in the center of the wearer's gaze. Substantially all of the light passing through the optical zone can be focused at a single point in the eye based on gaze.

One type of translating lens has a truncated shape. That is, unlike most lenses that are continuously circular or oval, the lower portion of the truncated contact lens is flattened by cutting off or shortening that part of the lens. This results in a substantially flat, thick edge at the bottom of the lens. Exemplary descriptions of such lenses include U.S. Pat. Nos. 7,543,935, 7,430,930, 7,052,132, and 4,549,794 incorporated herein by reference. Unfortunately, a relatively flat edge on contact lenses such as these tends to reduce comfort. It is desirable to have a translating contact lens with improved comfort.

Another type of translating lens has an outer shape which is continuously circular or oval, but contains a substantially thickened portion peripheral to the central optical zone. This thickened portion is intended to contact the lower lid and translate with blink. Exemplary references to such a lens are described in U.S. Pat. No. 7,040,757 and US 20100171924, incorporated herein by reference. In these examples, the thickness in the peripheral portions of the lens outside the optical zone is substantially uniform for meridians parallel to the vertical meridian of the lens, and a lens according to this invention exhibits mirror symmetry with respect to a plane cutting through the vertical meridian.

U.S. Pat. No. 7,216,978 shows that the upper and lower eyelids do not move strictly in a vertical, with an up and down stroke during blink. The upper lid moves substantially vertical, with a small nasal component during blink, and the lower lid moves substantially horizontal, moving nasalward during blink. Additionally, the upper and lower eyelids are not symmetrical with respect to a plane cutting through the vertical meridian.

Lens surfaces can be generated using different functions. For example, U.S. Pat. Nos. 3,187,338, and 5,975,694 describe a sine function; U.S. Pat. No. 6,843,563 uses a third order polynomial function, and U.S. Pat. No. 5,650,838 uses a tangent function; in U.S. Pat. No. 6,540,353 a lens surface is generated using a rapid power change over a small distance in the optical zone and in U.S. Pat. No. 5,608,471, a rapid transition on the lens surface is made by a straight linear function.

In U.S. Pat. No. 7,004,585, the distance and near centers of a translating lens both lie on the vertical bisector of the optical zone.

It would be advantageous to have a contact lens with a feature that fully engage the lower eyelid of the wearer to facilitate lens translation and which provides improved wearing comfort.

SUMMARY OF THE INVENTION

The invention is a translating contact lens comprising features which are asymmetric about the vertical meridian. In one aspect of the invention, this feature is a pseudotruncation.

In another another aspect of the invention, the pseudotruncation is substantially below the horizontal meridian of the lens.

In yet another aspect of the invention, the optical zone is asymmetric about the vertical meridian of the lens.

In yet another aspect of the invention, both the pseudotruncation and optical zone are asymmetric about the vertical meridian of the lens.

In yet another aspect of the invention, the pseudotruncation is rotated nasally up and asymmetric about the vertical meridian of the lens.

In yet another aspect of the invention, the pseudotruncation is rotated nasally up by between about 1 to 15 degrees and preferably between about 7 to 8 degrees.

In yet another aspect of the invention, the pseudotruncation is rotated nasally down by between about 1 to 10 degrees.

In yet another aspect of the invention, the optical zone is rotationally aligned with the pseudotruncation.

In yet another aspect of the invention, the optical zone is not rotationally aligned with the pseudotruncation.

In yet another aspect of the invention, the optical zone is inset horizontally nasalward and asymmetric about the vertical meridian of the lens.

In yet another aspect of the invention, the optical zone is rotated nasally up and asymmetric about the vertical meridian of the lens.

In yet a further aspect of the invention, the pseudotruncation is comprised of more than one elevated zone.

In yet another aspect of the invention, the angular subtense of the pseudotruncation when it is at least about 80% of its maximum thickness, is between about 40 and about 100 degrees.

In yet another aspect of the invention, the pseudotruncation varies in height or circumferential angular subtense with changes in refractive prescription.

In yet another aspect of the invention, the radial position of the peak thickness value of the pseudotruncation at any meridian around the lens is substantially constant, the arc being a portion of a concentric circle about the lens center.

In yet another aspect of the invention, the radial position of the peak thickness value of the pseudotruncation at any meridian around the lens is variable, the arc not being a portion of a concentric circle about the lens center.

In yet another aspect of the invention, the outer circumference of the lens is not circular, and not concentric about the lens center.

In yet a further aspect of the invention, the width of the bevel portion of the pseudotruncation is between about 50 and about 500 microns.

In yet a further aspect of the invention, the position of the bevel flange junction is between about 5 to about 7 mm.

In yet a further aspect of the invention, the maximum radial thickness at the lenticular bevel junction is between about 300 and about 600 microns.

In yet a further aspect of the invention, the maximum radial thickness at the bevel flange junction is between about 75 and about 250 microns.

In yet a further aspect of the invention, the design of the pseudotruncation is based upon measurements of a population, sub-population or group.

In yet a further aspect of the invention, the design of the pseudotruncation is based upon measurements of a single individual.

In yet a further aspect of the invention, the design of the pseudotruncation is based upon mathematical smoothing functions applied between fixed defined points.

In yet a further aspect of the invention, the design of the pseudotruncation is based upon a mathematical smoothing function based upon scaling from the value derived from the $\sin^2$ function applied between fixed defined points.

In yet a further aspect of the invention, the design of the pseudotruncation is based upon a mathematical smoothing function based upon scaling from the following equation:

$$T_3 = T_1 + (T_2 - T_1) * (\sin((P_3 - P_1)/(P_2 - P_1) * 90))^n \quad \text{Equation 1}$$

wherein P1 is the distance from the lens center to optical lenticular junction and T1 is the thickness at optical lenticular junction, P2 is the distance from the lens center to lenticular bevel junction, and T2 is the thickness at lenticular junction. P3 and T3 are the arbitrary distance from the lens center and thickness at an arbitrary position.

In yet a further aspect of the invention, the preferred value of n is between about 1.25 and about 4. The more preferred value of n is between about 1.5 and about 2.5. The most preferred value of n is 2.

In yet a further aspect of the invention, the surface of the lens or a portion thereof, is generated by specifying a fixed thickness at two points on the lens and then scaling a smooth surface between said points, the scaling using the sine or cosine taken to an exponential power between about 1.25 and about 4.

In yet a further aspect of the invention, the surface of the lens or a portion thereof, is generated by specifying a fixed thickness at two points on the lens and then scaling a smooth surface between said points, the scaling using the sine or cosine taken to an exponential power of about 2.

In yet a further aspect of the invention, a pseudotruncation according to this invention comprises an elongated, arcuate thickened portion in the lens, peripheral to the optical zone but inside of the edge, wherein said thickened portion is asymmetrical with the vertical meridian of the lens, and the thickened portion engages with the lower eyelid to achieve translation on the eye.

DETAILED DESCRIPTION

Figure 1:
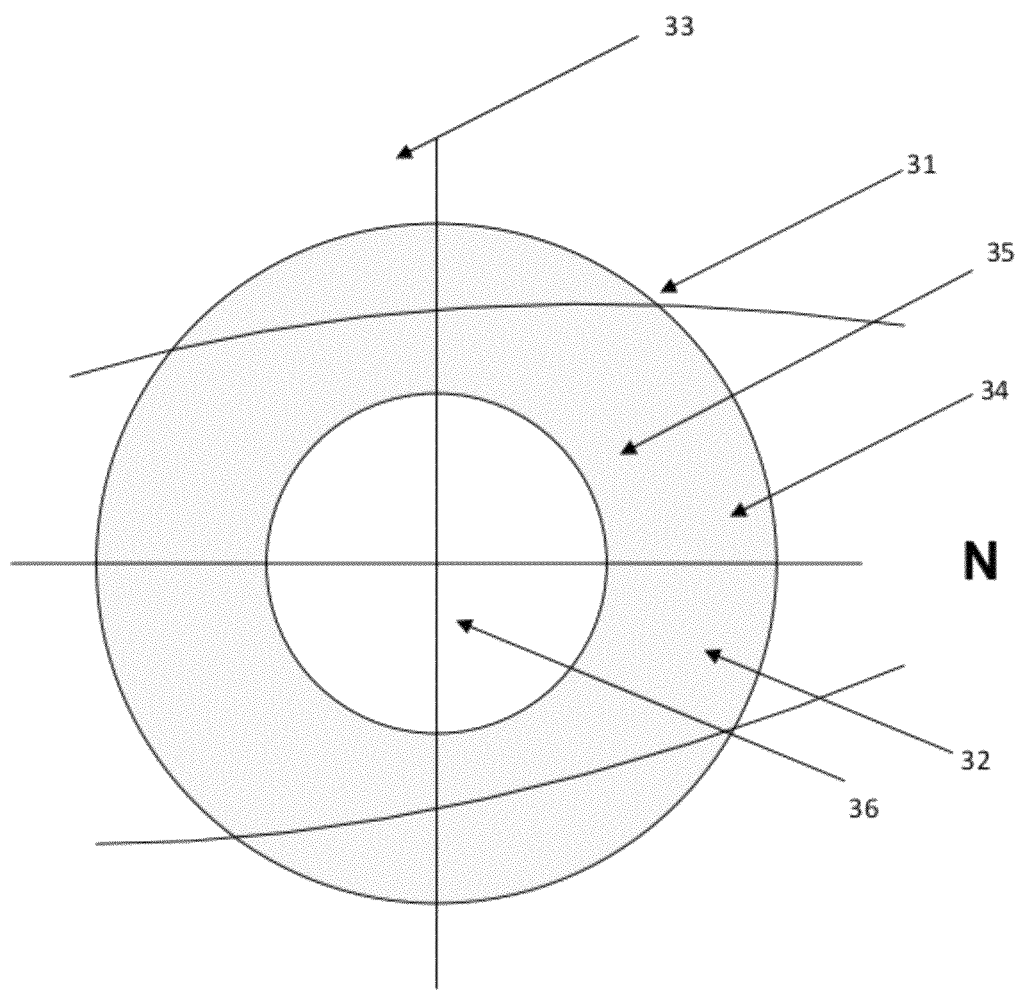
FIG. 1 depicts the eyelid asymmetry typically found.

The invention provides methods for correcting presbyopia, contact lenses for such correction, and methods for producing the lenses of the invention. The lenses of the invention are translating, multifocal contact lenses with pseudotruncations. The pseudotruncation of the invention is asymmetric about a vertical meridian of the lens. The translating contact lenses of the invention are lenses without a substantially flat or straight portion about their outermost circumference. The circumference may be substantially circular or smooth and continuous; or it may be asymmetric. The lenses of the present invention comprise an optical zone, a peripheral pseudotruncation located radially outwards from the optical zone, and an edge zone located radially outwards from the peripheral zone and encompassing the lens edge.

The "optical zone" is defined as the substantially central portion of the lens which contains the visual power correction for the wearer's ametropia and presbyopia. "Ametropia" is defined as the optical power needed to provide good visual acuity, generally at far distance. It is recognized that this would include myopia or hyperopia, and astigmatism concurrent with either. Presbyopia is corrected by adding algebraically plus optical power to a portion of the optical zone to correct the wearer's near visual acuity requirements. It is recognized that these optical powers may be created by refractive means, or diffractive means, or both.

The optical zone comprises at least at least one near vision zone and preferably at least one distance vision zone. Alternatively, the optical zone has more than one distance vision zone and/or more than one near vision zone; preferably, one distance vision zone lies substantially at or above the horizontal meridian of the lens and a near vision zone lies at or beneath the horizontal meridian. Optionally, the optical zone of the lens has one or more intermediate vision zones. Intermediates vision zones contain a partial or fractional presbyopic add power. The optical zone may be symmetrical or asymmetrical with respect to the vertical meridian of the lens. Preferably, it is vertically asymmetrical. The "optical zone" is the combination of distance, near and optionally, intermediate vision zones. The transitions between the distance, near and optionally intermediate zones may be abrupt and occur over a very small distance, as seen in a step power change, or smooth and occur over a larger distance, as in a progressive power change. In a preferred embodiment, the transitions are as abrupt as possible to avoid discomfort for the wearer and also to minimize the translation required.

A "distance vision zone" is a zone that provides the distance optical power or the amount of refractive power required to correct the lens wearer's distance vision acuity to the desired degree. A "near vision zone" is a zone that provides the near optical power or the amount of refractive power required to correct the wearer's near vision acuity to the desired degree. An "intermediate vision zone" is a zone that provides the optical power or the amount of refractive power required to correct the wearer's intermediate vision acuity for viewing objects typically between the wearer's preferred distance and near vision range. A "multi-focal translating contact lens" refers to a translating contact lens that comprises bifocal, trifocal or multi-focal optics.

The "vertical meridian" is defined as a line which runs from the inferior edge of the lens to the superior edge of the lens, through the lens geometric center. The "horizontal meridian" is defined as a line which runs from the nasal edge of the lens to the temporal edge of the lens, through the lens geometric center. The "lens center" is found at the intersection of the horizontal and vertical meridians.

A "pseudotruncation" is a design feature placed on the anterior surface of the lens in the peripheral zone surrounding the optical zone and optical zone junction, that enables a lens having it to translate or move on the eye as the direction of gaze changes so that distance or near vision is corrected accordingly. This feature participates in the translation of the lens by interacting with the lower eyelid so that as gaze is shifted down, the eyelid causes the lens to move in the direction of the superior portion of the eye. As the gaze is shifted up, the eyelid causes the lens to move in the direction of the inferior portion of the eye. Preferably, translation of the lens when the gaze is shifted down occurs due the pushing of the lower eyelid against the pseudotruncation.

A lens with a pseudotruncation according to this invention is not truncated in its lower portion and preferably is not truncated or flattened anywhere about its circumference. The pseudotruncation for a lens according to this invention comprises a lenticular portion, a lenticular bevel junction, a bevel portion, a bevel flange junction, and a flange portion, and is asymmetric about the vertical meridian of the lens.

In another embodiment, a pseudotruncation according to this invention comprises an elongated, arcuate thickened portion in the lens, peripheral to the optical zone but inside of the edge, wherein said thickened portion is asymmetrical with the vertical meridian of the lens, and the thickened portion engages with the lower eyelid to achieve translation on the eye.

"Lenticular portion" is a portion of the lens surface which extends radially out from center, beginning at the junction at the optical zone lenticular junction and ending at the lenticular bevel junction. "Bevel portion" is a portion of the lens surface which extends radially out from center, beginning at the junction at the lenticular bevel junction and ending at the bevel flange junction. "Flange portion" is a portion of the lens surface which extends radially out from center, beginning at the bevel flange junction and ending at the lens edge.

"Lenticular bevel junction" is the junction between the lenticular and bevel portions of a lens surface. "Bevel flange junction" is the junction between the bevel and flange portions of a lens surface. "Radial thickness" is the thickness of a lens as measured from a tangent to the back surface to the front surface at any position on the back surface. "Optical lenticular junction" is the junction between the near or distance optical zone and the lenticular portion.

The pseudotruncations described above are generally thickened portions of the lens (relative to the thickness of the rest of the optical zone) and generally have a steep portion. A substantial portion of the pseudotruncation is preferably below the horizontal meridian of the lens (a diameter running mid-way through the lens from right to left/temporal to nasal or vice versa). More preferably, the thickest portion of the pseudotruncation lies predominantly along the lower one third of lens with respect to the horizontal meridian and is curved and disposed to generally coincide in shape with the lower eyelid when in use. The peripheral most portions of the flange and the lens edge are expected to position underneath the bottom eyelid, and are preferably as thin as practical. More preferably they are 150 μ or less.

It is also preferable that the pseudotruncation be asymmetric about the vertical meridian of the lens with a bias towards the inferior or nasal portion of the lens. This aids in the interaction of the lens and the lower eyelid. In most cases, the shape or curvature of the upper and lower eyelids are not symmetrical with respect to a plane cutting through the vertical meridian of the eye. Additionally, the upper lid moves substantially vertical, with a small nasal component during blink, and the lower lid moves substantially horizontal, moving nasalward during blink. There are measurable differences between people in their eyelid anatomy, specifically the upper and lower eyelid shapes, and the palpebral aperture between the two lids. The asymmetric pseudotruncation can be designed based upon population or sub-group averages or custom designed for a single wearer.

FIG. 1 depicts major features of a typical right eye, as seen facing the patient. Vertical pupillary axis 33 bisects the pupil 36 vertically and similarly horizontal pupillary axis 34 bisects the pupil horizontally. The pupil center is located at the intersection of the vertical pupillary axis 33 and the horizontal pupillary axis 34. Surrounding the pupil is the iris 35. The upper eyelid margin 31 and the lower eyelid margin 32 are drawn in a typical presentation. It should be noted that the two eyelids are not horizontally tangent to the edge of the pupil 36, nor tangent to a line drawn parallel to the horizontal pupillary axis 34. The position of the nose is depicted as "N" in FIG. 1.

We have found the eyelids on average, are tilted with respect to the edge of the pupil 36, or tangent to a line drawn parallel to the horizontal pupillary axis 34. Most commonly, both eyelids are tilted nasally up as depicted in FIG. 1. In a large population sample, we found that the average tilt of the upper eyelid margin 31, when the eye is rotated about 30° downward to the reading position is about 5° nasally up, ranging as high as about 15° nasally up. By "nasally up" is meant that on the nasal side, the eyelid margin is tilted or rotated higher. In a similar fashion, we found that the average tilt of the lower eyelid margin 32, when the eye is rotated about 30° downward to the reading position is about 7° nasally up, ranging as high as about 15° nasally up. Since the eyelid margins are tilted and asymmetrical relative to the horizontal meridian, or a line parallel to it, it is advantageous to construct a translating contact lens with asymmetric optics and pseudotruncation which matches the lid position, in order to better engage the contact lens and enable vertical translation.

Figure 2:
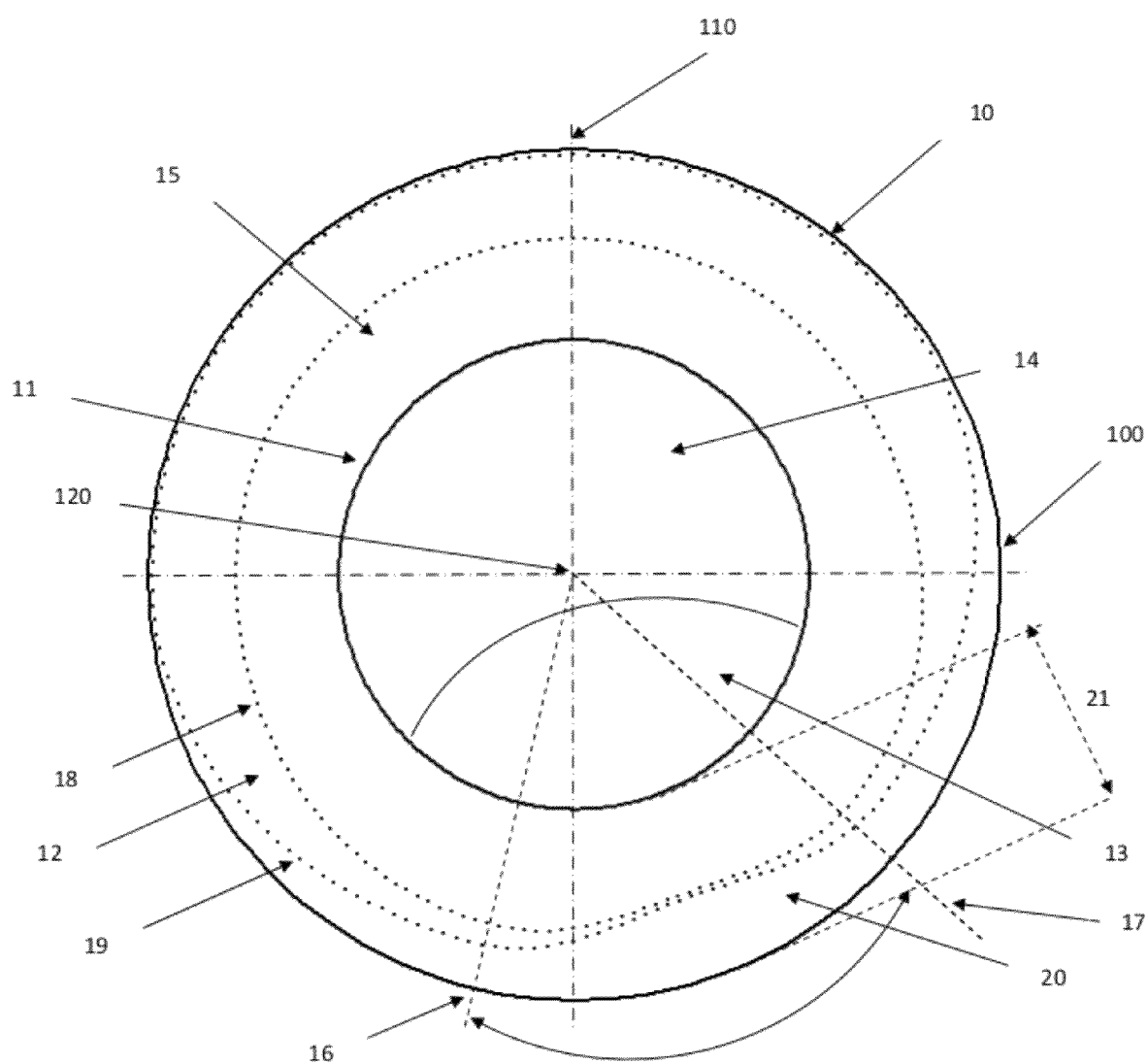
FIG. 2 depicts one embodiment of a lens of the invention, in plan view.

In a preferred embodiment, referring to FIG. 2 lens 10 has an anterior surface, as shown, and a posterior surface, that is not shown. The outermost circumference of lens 10 is symmetrical about the vertical meridian 110 and lens center 120. Lines 100 and 110 represent the horizontal, or 0-180 degree, and vertical, or 90-270 degree, meridians of the lens, respectively. At the intersection of the horizontal 100 and vertical 110 lines is the lens center, 120. On the anterior surface of the lens is a distance optical zone 14 and a near optical zone 13, both ending at the optical lenticular junction 11.

Peripheral to the optical lenticular junction 11 is a pseudotruncation 21. Said pseudotruncation 21 comprises a lenticular portion 15, a lenticular bevel junction 18, a bevel portion 12, a bevel flange junction 19, and a flange portion 20. Within said pseudotruncation 21, the lenticular portion 15 surrounds the optical lenticular junction 11. Surrounding the lenticular portion 15 is the lenticular bevel junction 18. Further surrounding the lenticular bevel junction 18 is the bevel portion 12. The bevel portion 12 is surrounded by the bevel flange junction 19 and the flange portion 20. In a preferred embodiment, pseudotruncation 21 is asymmetric about the vertical meridian.

In a preferred embodiment, the pseudotruncation 21, and the distance optical zone 14 and near optical zone 13 are tilted nasally up by between about 1 to 15°. In a more a preferred embodiment, the pseudotruncation 21, and the distance optical zone 14 and near optical zone 13 are tilted nasally up by between about 7 to 8°. In another preferred embodiment, the pseudotruncation 21, and the distance optical zone 14 and near optical zone 13 are tilted nasally up by between about 7 to 8°, and both of the optical zones 14, 13 are inset nasally by about 0.5 to 1.5 mm. In another embodiment, only the near optical zone 13 is inset nasally by about 0.5 to 1.5 mm.

For convenience, the boundaries of the various zones in all of FIG. 2 are shown as discrete lines. However, one ordinarily skilled in the art will recognize that the boundaries may be blended or aspheric. The boundaries are smoothed using a scaling function which is generated by specifying a fixed thickness at two points on the lens and then scaling a smooth surface between said points, the scaling using the sine or cosine taken to a preferred exponential power between about 1.25 and about 4, with a more preferred value of about 2.

Again referring to FIG. 2, described in a circumferential fashion, the pseudotruncation 21 has a maximum radial thickness between lines 16 and 17. Lines 16 and 17 represent the position where the radial thickness is at least about 80% of the maximum thickness. The angle subtended between lines 16 an 17 can be between about 40° and about 100°, preferably about 60°. In this example, the region of maximum radial thickness is not symmetric around the vertical meridian 110, and is continuous. The region of maximum thickness is rotated 20° counterclockwise from the vertical meridian 110. The width of the bevel portion 12 can be between about 50μ and about 500μ, preferably about 100μ. The radial thickness at the lenticular bevel junction 18 is between about 300μ to 600μ, the preferred being about between about 450μ to about 475μ. The radial thickness at the bevel flange junction 19 is between about 75μ to 250μ, the preferred being about between about 120μ to about 175μ.

Again referring to FIG. 2, the radial thickness of the lenticular portion 15 is achieved by the use of a mathematical function, with a $sin^2$ function being preferred. The radial thickness and width of the lenticular portion 15 are variable. The radial thickness at the optical lenticular junction 11 varies with the patient's refractive prescription power. The radial thickness of the bevel portion 12 is achieved by the use of a mathematical function, with a $sin^2$ function being preferred. The radial thickness and width of the bevel portion 12 are variable. The width of the flange portion 20 is variable as defined by the distance of the bevel flange junction 19 from the lens center 120. The flange portion 20 can be described mathematically by a $sin^2$ function or it could be spherical or aspherical. It is preferred that the flange portion 20 is between about 0.2 to about 1.4 mm in width.

Figure 3:
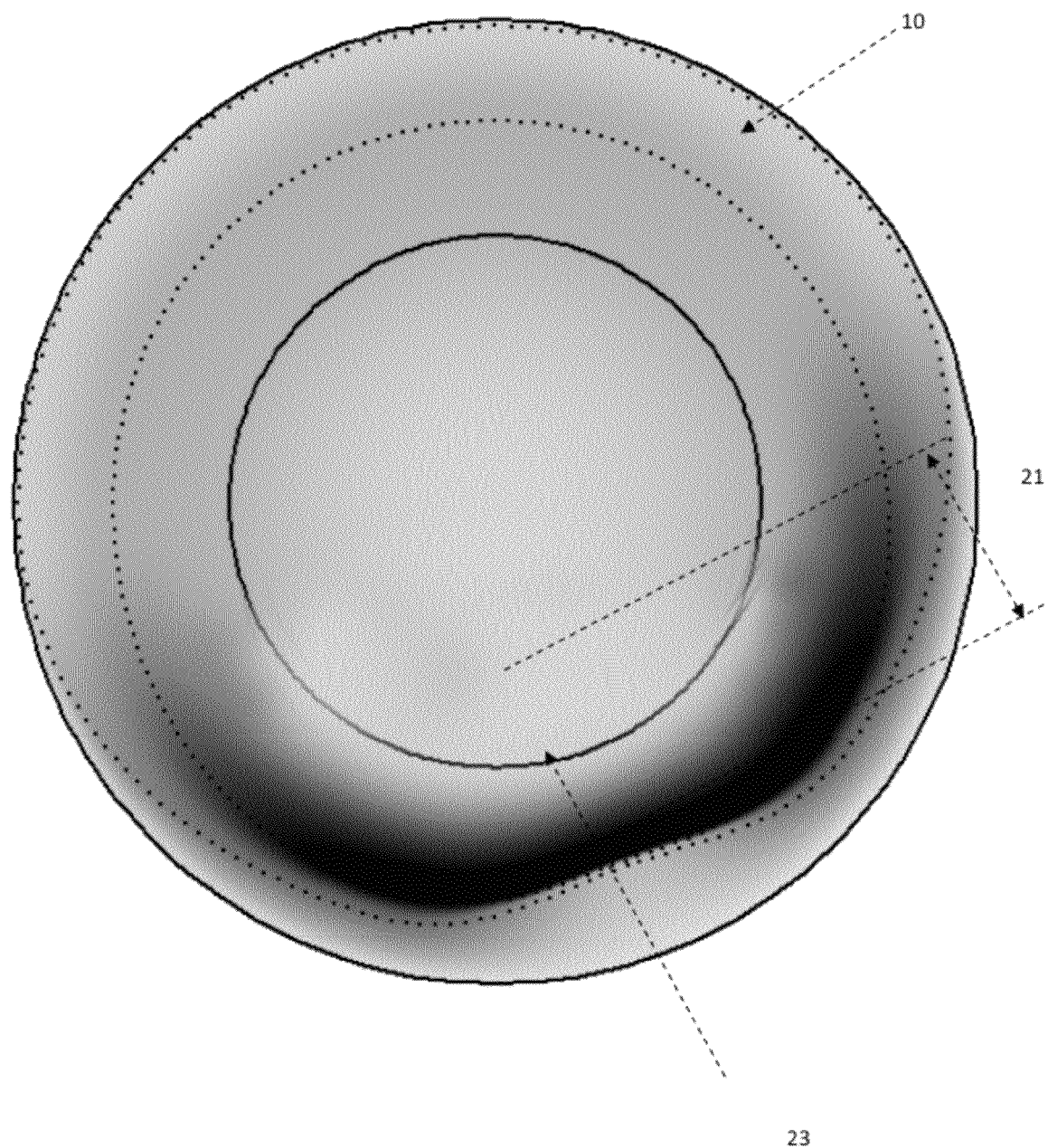
FIG. 3 depicts one embodiment of a lens of the invention, shaded for thickness.

Referring to FIG. 3, lens 10 described in plan view in FIG. 2 is shown as a thickness map. Thicker portions are shaded darker, and thinner portions are shaded lighter. The pseudotruncation 21 is continuous at it's midpoint 23.

Figure 4:
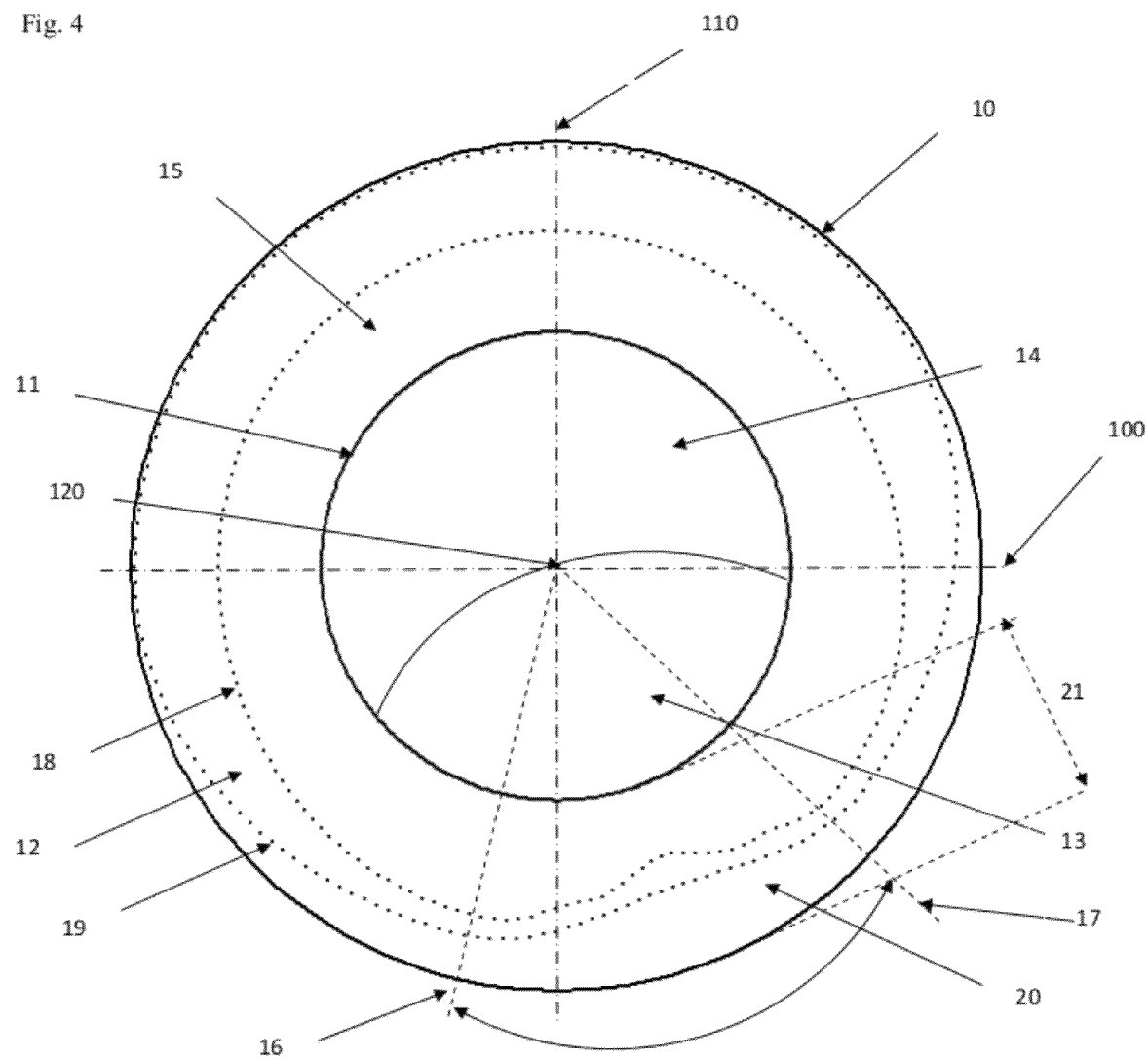
FIG. 4 depicts another embodiment of a lens of the invention, in plan view.

In another preferred embodiment, referring to FIG. 4 lens 10 has an anterior surface, as shown, and a posterior surface, that is not shown. The outermost circumference of lens 10 is symmetrical about the vertical meridian 110 and lens center 120. Lines 100 and 110 represent the horizontal, or 0-180 degree, and vertical, or 90-270 degree, meridians of the lens, respectively. At the intersection of the horizontal 100 and vertical 110 lines is the lens center, 120. On the anterior surface of the lens is a distance optical zone 14 and a near optical zone 13, both ending at the optical lenticular junction 11.

Peripheral to the optical lenticular junction 11 is a pseudotruncation 21. Said pseudotruncation 21 comprises a lenticular portion 15, a lenticular bevel junction 18, a bevel portion 12, a bevel flange junction 19, and a flange portion 20. Within said pseudotruncation 21, the lenticular portion 15 surrounds the optical lenticular junction 11. Surrounding the lenticular portion 15 is the lenticular bevel junction 18. Further surrounding the lenticular bevel junction 18 is the bevel portion 12. The bevel portion 12 is surrounded by the bevel flange junction 19 and the flange portion 20. In a preferred embodiment, pseudotruncation 21 is asymmetric about the vertical meridian.

In a preferred embodiment, the pseudotruncation 21, and the distance optical zone 14 and near optical zone 13 are tilted nasally up by between about 1 to 15°. In a more a preferred embodiment, the pseudotruncation 21, and the distance optical zone 14 and near optical zone 13 are tilted nasally up by between about 7 to 8°. In another preferred embodiment, the pseudotruncation 21, and the distance optical zone 14 and near optical zone 13 are tilted nasally up by between about 7 to 8°, and both of the optical zones 14, 13 are inset nasally by about 0.5 to 1.5 mm. In another embodiment, only the near optical zone 13 is inset nasally by about 0.5 to 1.5 mm.

For convenience, the boundaries of the various zones in all FIG. 4 are shown as discrete lines. However, one ordinarily skilled in the art will recognize that the boundaries may be blended or aspheric. The boundaries are smoothed using a scaling function which is generated by specifying a fixed thickness at two points on the lens and then scaling a smooth surface between said points, the scaling using the sine or cosine taken to a preferred exponential power between about 1.25 and about 4, with a more preferred value of about 2.

Again referring to FIG. 4, described in a circumferential fashion, the pseudotruncation 21 has a maximum radial thickness between lines 16 and 17. Lines 16 and 17 represent the position where the radial thickness is at least about 80% of the maximum thickness. The angle subtended between lines 16 an 17 can be between about 40° and about 100°, preferably about 60°. In this example, the region of maximum radial thickness is not symmetric around the vertical meridian 110, and is continuous. The region of maximum thickness is rotated 20° counterclockwise from the vertical meridian 110. The width of the bevel portion 12 can be between about 50μ and about 500μ, preferably about 100μ. The radial thickness at the lenticular bevel junction 18 is between about 300μ to 600μ the preferred being about between about 450μ to about 475μ. The radial thickness at the bevel flange junction 19 is between about 75μ to 250μ the preferred being about between about 120μ to about 175μ.

Again referring to FIG. 4, the radial thickness of the lenticular portion 15 is achieved by the use of a mathematical function, with a $sin^2$ function being preferred. The radial thickness and width of the lenticular portion 15 are variable. The radial thickness at the optical lenticular junction 11 varies with the patient's refractive prescription power. The radial thickness of the bevel portion 12 is achieved by the use of a mathematical function, with a $sin^2$ function being preferred. The radial thickness and width of the bevel portion 12 are variable. The width of the flange portion 20 is variable as defined by the distance of the bevel flange junction 19 from the lens center 120. The flange portion 20 can be described mathematically by a $sin^2$ function or it could be spherical or aspherical. It is preferred that the flange portion 20 is between about 0.2 to about 1.4 mm in width.

Figure 5:
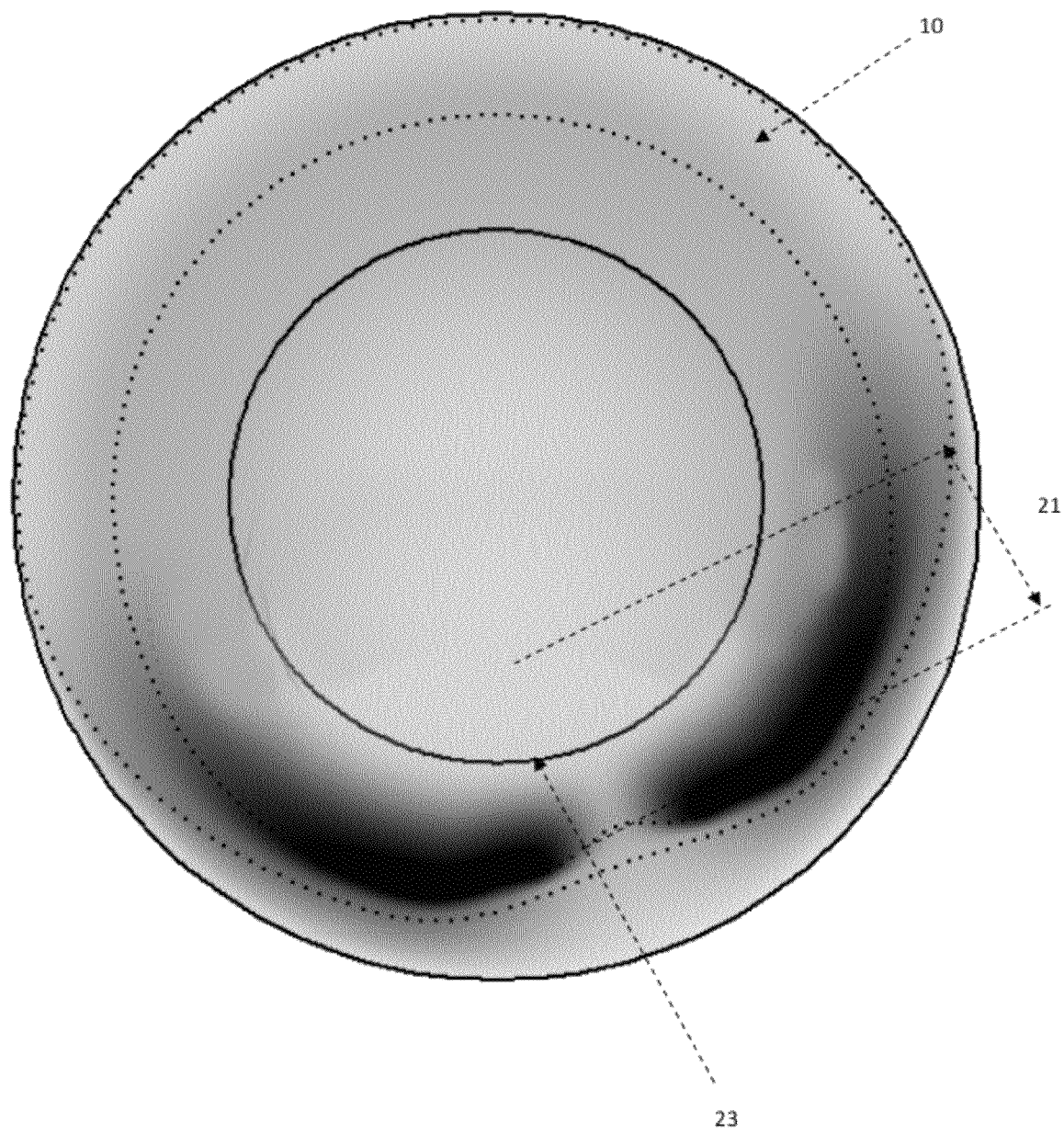
FIG. 5 depicts one embodiment of a lens of the invention, shaded for thickness.

Referring to FIG. 5, lens 10 described in plan view in FIG. 4 is shown as a thickness map. Thicker portions are shaded darker, and thinner portions are shaded lighter. The pseudotruncation 21 is not continuous at its' midpoint 23, and transition zone 21 is broken into multiple pieces.

Figure 6:
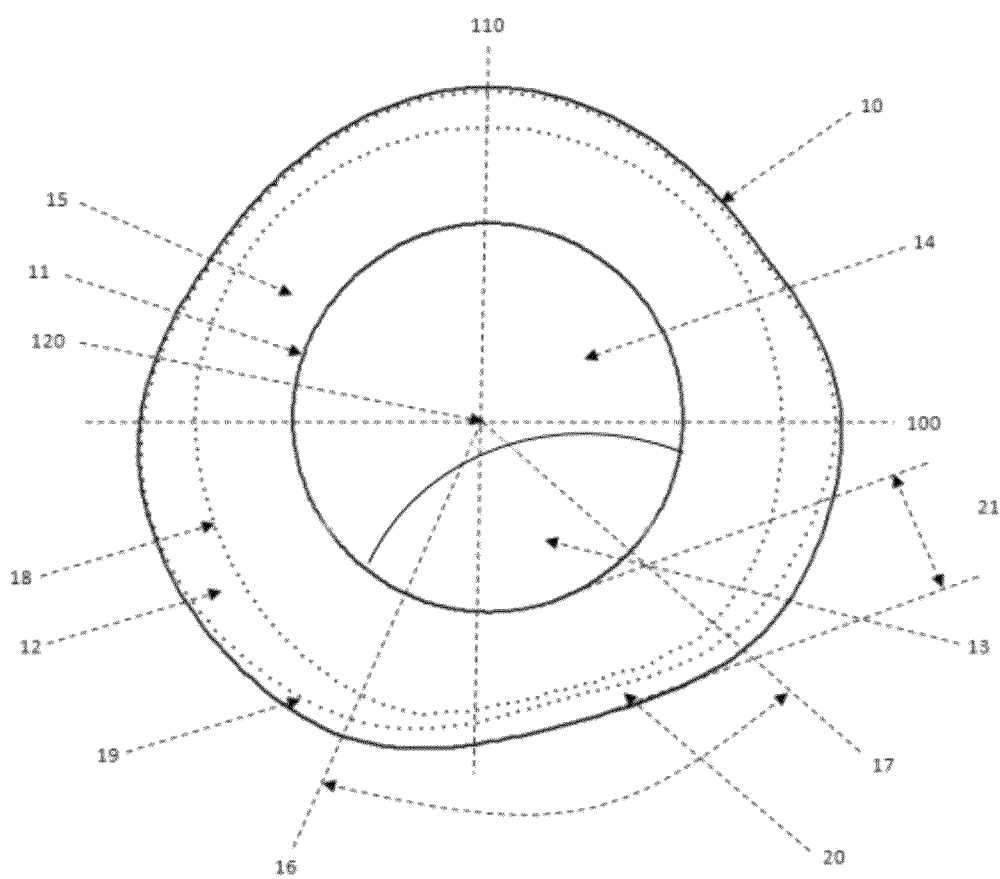
FIG. 6 depicts yet another embodiment of a lens of the invention, in plan view.

In another preferred embodiment, referring to FIG. 6 lens 10 has an anterior surface, as shown, and a posterior surface, that is not shown. Lines 100 and 110 represent the horizontal, or 0-180 degree, and vertical, or 90-270 degree, meridians of the lens, respectively. At the intersection of the horizontal 100 and vertical 110 lines is the lens center, 120. The outer circumference of the lens 10 is not circular, and not concentric about the lens center 120, the whole lens 10 asymmetric about the vertical meridian 110. In a preferred embodiment, lens 10 is symmetric about the vertical meridian 110 for portions of said lens above the horizontal meridian 100; and asymmetric for portions of the lens below said horizontal meridian 100. On the anterior surface of the lens is a distance optical zone 14 and a near optical zone 13, both ending at the optical lenticular junction 11.

Peripheral to the optical lenticular junction 11 is a pseudotruncation 21. Said pseudotruncation 21 comprises a lenticular portion 15, a lenticular bevel junction 18, a bevel portion 12, a bevel flange junction 19, and a flange portion 20. Within said pseudotruncation 21, the lenticular portion 15 surrounds the optical lenticular junction 11. Surrounding the lenticular portion 15 is the lenticular bevel junction 18. Further surrounding the lenticular bevel junction 18 is the bevel portion 12. The bevel portion 12 is surrounded by the bevel flange junction 19 and the flange portion 20. In a preferred embodiment, pseudotruncation 21 is asymmetric about the vertical meridian.

In a preferred embodiment, the pseudotruncation 21, and the distance optical zone 14 and near optical zone 13 are tilted nasally up by between about 1 to 15°. In a more a preferred embodiment, the pseudotruncation 21, and the distance optical zone 14 and near optical zone 13 are tilted nasally up by between about 7 to 8°. In another preferred embodiment, the pseudotruncation 21, and the distance optical zone 14 and near optical zone 13 are tilted nasally up by between about 7 to 8°, and both of the optical zones 14, 13 are inset nasally by about 0.5 to 1.5 mm. In another embodiment, only the near optical zone 13 is inset nasally by about 0.5 to 1.5 mm.

For convenience, the boundaries of the various zones in all of the figures are shown as discrete lines. However, one ordinarily skilled in the art will recognize that the boundaries may be blended or aspheric. The boundaries are smoothed using a scaling function which is generated by specifying a fixed thickness at two points on the lens and then scaling a smooth surface between said points, the scaling using the sine or cosine taken to a preferred exponential power between about 1.25 and about 4, with a more preferred value of about 2.

Again referring to FIG. 6, described in a circumferential fashion, the pseudotruncation 21 has a maximum radial thickness between lines 16 and 17. Lines 16 and 17 represent the position where the radial thickness is at least about 80% of the maximum thickness. The angle subtended between lines 16 an 17 can be between about 40° and about 100°, preferably about 60°. In this example, the region of maximum radial thickness is not symmetric around the vertical meridian 110, and is continuous. The region of maximum thickness is rotated 20° counterclockwise from the vertical meridian 110. The width of the bevel portion 12 can be between about 50µ and about 500µ, preferably about 100µ. The radial thickness at the lenticular bevel junction 18 is between about 300µ to 600µ the preferred being about between about 450µ to about 475µ. The radial thickness at the bevel flange junction 19 is between about 75µ to 250µ the preferred being about between about 120µ to about 175µ.

Again referring to FIG. 6, the radial thickness of the lenticular portion 15 is achieved by the use of a mathematical function, with a $sin^2$ function being preferred. The radial thickness and width of the lenticular portion 15 are variable. The radial thickness at the optical lenticular junction 11 varies with the patient's refractive prescription power. The radial thickness of the bevel portion 12 is achieved by the use of a mathematical function, with a $sin^2$ function being preferred. The radial thickness and width of the bevel portion 12 are variable. The width of the flange portion 20 is variable as defined by the distance of the bevel flange junction 19 from the lens center 120. The flange portion 20 can be described mathematically by a $sin^2$ function or it could be spherical or aspherical. It is preferred that the flange portion 20 is between about 0.2 to about 1.4 mm in width.

Figure 7:
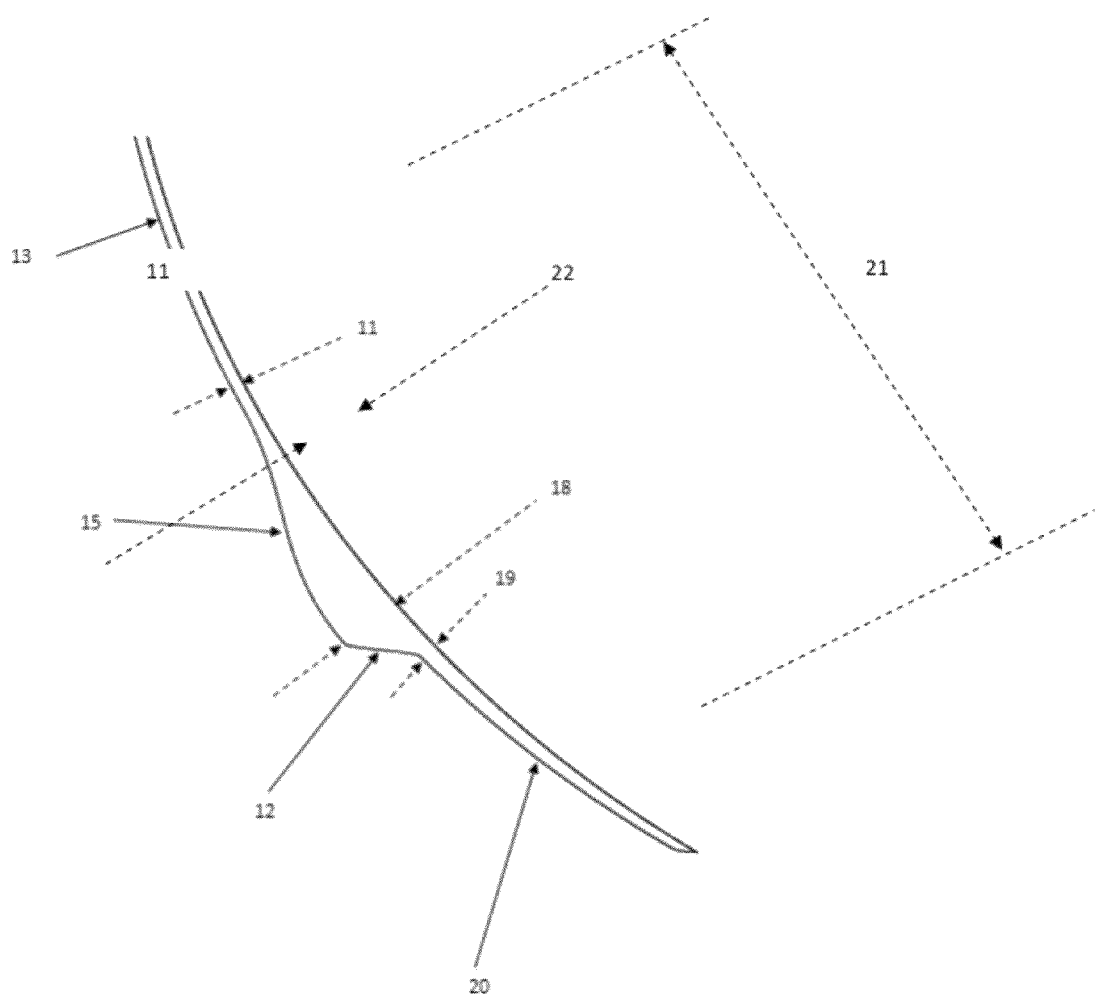
FIG. 7 shows a cross section of the pseudotruncation according to the invention.

Referring to FIG. 7, a cross section along the inferior portion of the lens 10, from the lens center through the thickest section of the pseudotruncation 21 of a lens according to FIG. 1 is shown. The innermost zone shown is the near optical zone 13, which ends at the optical lenticular junction 11. Outside of the optical lenticular junction 11 is the lenticular portion 15. Surrounding the lenticular portion 15 is the lenticular bevel junction 18. Further surrounding the lenticular bevel junction 18 is the bevel portion 12. The bevel portion 12 is surrounded by the bevel flange junction 19 and the flange portion 20. An arbitrary thickness is found at 22. The pseudotruncation 21 for a lens according to this invention is constructed with a lenticular portion 15, a lenticular bevel junction 18, a bevel portion 12, a bevel flange junction 19, and a flange portion 20.

Again referring to FIG. 7, the thickness of the lens is described by scaling a mathematical smoothing function in order to accomplish a smooth and continuous change in thickness on the surface of lens 10. While many such functions are known in the art, using a scaling based on the sine has been found to be optimal, as it has the advantage of not having abrupt changes in slope, and that at its' midpoint, it has a value of 0.5. By contrast, using a straight line to join the two segments will also produce a midpoint value of 0.5, it will exhibit abrupt junctions at the two outermost end points. The scaling values are derived from the sine function in the first quadrant, however it is recognized that the values of the cosine in the fourth quadrant may also be used.

In the present invention, again referring to FIG. 7, scaling using the $sin^2$ function is accomplished by defining the desired thickness of the lens at several fixed points, and calculating the thickness of the surface at any point between them. In one example, the thickness at the optical lenticular junction 11 is fixed at 137µ while the thickness at the lenticular bevel junction 18 is fixed at 460µ. This can be shown in Equation 1 where P1 is the distance from the lens center to optical lenticular junction 11 and T1 is the thickness at optical lenticular junction 11. Similarly, P2 is the distance from the lens center to lenticular bevel junction 18 and T2 is the thickness at lenticular junction 18. P3 and T3 are the arbitrary distance from the lens center and thickness at this position 22.

$$T_3 = T_1 + (T_2 - T_1) * (Sin((P_3 - P_1)/(P_2 - P_1) * 90))^n \qquad \text{Equation 1]}$$

The preferred value of n is between about 1.25 and about 4. The more preferred value of n is between about 1.5 and about 2.5. The most preferred value of n is 2. While this example describes the smooth thickness change radially from the center of lens 10, it should be appreciated by those skilled in the art that it could be used to describe the thickness and thickness change in a circumferential fashion.

In one preferred embodiment of the invention, the pseudotruncation 21 is substantially below the horizontal meridian 100 of the lens. In another preferred embodiment of the invention, the pseudotruncation 21 is comprised of more than one elevated zone. In yet another preferred embodiment of the invention, the pseudotruncation 21 varies in height or circumferential angular subtense on a basis of data from an individual wearer. In yet another preferred embodiment of the invention, the radial position of the peak thickness value of the pseudotruncation 21 at any meridian around the lens is substantially constant, the arc being a portion of a concentric circle about the lens center. In yet another preferred embodiment of the invention, the radial position of the peak thickness value of the pseudotruncation 21 at any meridian around the lens is variable, the arc not being a portion of a concentric circle about the lens center. In yet another preferred embodiment of the invention, the outer circumference of the lens 10 is substantially circular, or concentric with a constant radius about the lens center 120. In yet another preferred embodiment of the invention, the outer circumference of the lens 10 is not circular, and not concentric about the lens center 120.

In a preferred embodiment of the invention, the slope, width and height parameters of the pseudotruncation 21 can be determined from population averages. In another preferred embodiment, the slope, width and height parameters of the pseudotruncation 21 can be determined from data from an individual wearer. In another preferred embodiment, the slope, width and height parameters of the pseudotruncation 21 can be determined from refractive prescription data.

The one or more optical zones 13, 14, of the lenses are generally surrounded by non-optical, lenticular zones. The optical zones 13. 14, have at least one near and one distance vision zones as described, for example, in U.S. Pat. No. 7,503,652 incorporated by reference herein in its entirety. Many different shapes of vision zones are possible. Optics can be bifocal, trifocal or have even more vision zones. Optical zones can be circular or non circular in shape; arcuate, straight line, multiple concentric, radially varying concentric, progressively changing power functions, and geometric inset segments.

The optical zone of at least one of the anterior and posterior surfaces of a multi-focal translating contact lens according to this invention can include a distant vision zone, an intermediate vision zone, and a near vision zone. The multi-focal translating contact lens can provide distant vision correction at a primary gaze (e.g. driving), intermediate vision correction at a half-down-gaze (e.g. work on computer) and near vision correction at full-down-gaze (e.g. read books and newspaper).

In one embodiment, the intermediate vision zone in a multi-focal translating lens of the invention is a progressive power zone, which has an optical power that continuously changes from the distant vision to the near vision. Effective use of a trifocal translating contact lens or a multi-focal translating contact lens having a progressive power zone requires varying amounts of translation across the surface of the eye when the eye changes from gazing at an object at a distance (primary gaze) to gazing at an object at an intermediate distance (partially-down or half-down gaze) or to gazing at a nearby object (fully-down gaze). This is controlled by the presence of the pseudotruncation.

The lenses of the invention can optionally include features to orient the lens for stabilization. These are in addition to the pseudotruncation and serve to make sure that the pseudotruncation is on the bottom of the lens, adjacent to the lower eyelid when worn. Stabilization or orientation features include stabilization zones, prism ballast, slab off, dynamic stabilization and the like.

The contact lenses of the invention may be either hard or soft lenses, but preferably are soft contact lenses. Soft contact lenses, made of any material suitable for producing such lenses, preferably are used. Suitable preferred materials for forming soft contact lenses using the method of the invention include, without limitation, silicone elastomers, silicone-containing macromers including, without limitation, those disclosed in U.S. Pat. Nos. 5,371,147, 5,314,960, and 5,057,578 incorporated in their entireties herein by reference, hydrogels, silicone-containing hydrogels, and the like and combinations thereof. More preferably, the lens material contains a siloxane functionality, including, without limitation, polydimethyl siloxane macromers, methacryloxypropyl polyalkyl siloxanes, and mixtures thereof, a silicone hydrogel or a hydrogel, made of monomers containing hydroxy groups, carboxyl groups, or combinations thereof. Materials for making soft contact lenses are well known and commercially available. Preferably, the material is senofilcon, narafilon, acquafilcon, etafilcon, genfilcon, lenefilcon, balafilcon, or lotrafilcon.

The lenses of the invention may have any of a variety of corrective optical characteristics incorporated onto the surfaces in addition to distance and near optical powers, such as, for example, cylinder power for the correction of astigmatism, or prism power for the correction of orthoptic or ocular motility problems.

The invention may be further clarified by a consideration of the following examples.

EXAMPLES

Example 1

Prophetic

A senofilcon lens in accordance with FIG. 2 is provided. Again referring to FIG. 2, the pseudotruncation 21 has a maximum radial thickness where the radial thickness is about 80% of the maximum thickness of about 462 microns. In this example, the region of maximum radial thickness is symmetric around the vertical meridian 110, and is continuous. Taken along the meridian from the lens center 120 where the thickness of the lenticular bevel is a maximum, the width of the lenticular portion 15 is about 2.625 mm, the width of the bevel portion 12 is about 0.40 mm, and the width of the flange portion 20 is about 0.20 mm. The radial thickness at the lenticular bevel junction 18 is 460μ. The radial thickness at the bevel flange junction 19 is between about 120μ to 289μ. The radial thickness of the lenticular portion 15 is achieved by the use of a $\sin^2$ function. The radial thickness of the bevel portion 12 is achieved by the use of a $\sin^2$ function. The flange portion 20 is described mathematically by a $\sin^2$ function or it could be spherical or aspherical. Lenses according to this example translate on the eye by about 1 mm, and are comfortable for the wearer.

Example 2

Prophetic

A senofilcon lens in accordance with FIG. 2 is provided. Again referring to FIG. 2, the pseudotruncation 21 has a maximum radial thickness where the radial thickness is about 80% of the maximum thickness of about 462°. In this example, the region of maximum radial thickness is not symmetric around the vertical meridian 110, and is continuous. Taken along the meridian from the lens center 120 where the thickness of the lenticular bevel is maximum, the width of the lenticular portion 15 is about 1.25 mm, the width of the bevel portion 12 is about 100μ, and the width of the flange portion 20 is about 1.4 mm. The radial thickness at the lenticular bevel junction 18 is 460μ. The radial thickness at the bevel flange junction 19 is between about 120 to 289μ. The radial thickness of the lenticular portion 15 is achieved by the use of a $\sin^2$ function. The radial thickness of the bevel portion 12 is achieved by the use of a $\sin^2$ function. The flange portion 20 is described mathematically by a $\sin^2$ function or it could be spherical or aspherical. Lenses according to this example translate on the eye by about 1 mm, and are comfortable for the wearer.

Example 3

Prophetic

A senofilcon lens in accordance with FIG. 2 is provided. Again referring to FIG. 2, the pseudotruncation 21 has a maximum radial thickness where the radial thickness is about 80% of the maximum thickness of about 462°. In this example, the region of maximum radial thickness is symmetric around the vertical meridian 110, and is not continuous. Taken along the meridian from the lens center 120 where the thickness of the lenticular bevel is maximum, the width of the lenticular portion 15 is about 2.25 mm, the width of the bevel portion 12 is about 200μ, and the width of the flange portion 20 is about 0.60 mm. The radial thickness at the lenticular bevel junction 18 is 460μ. The radial thickness at the bevel flange junction 19 is between about 120 to 289μ. The radial thickness of the lenticular portion 15 is achieved by the use of a $\sin^2$ function. The radial thickness of the bevel portion 12 is achieved by the use of a $\sin^2$ function. The flange portion 20 is described mathematically by a $\sin^2$ function or it could be spherical or aspherical. Lenses according to this example translate on the eye by about 1 mm, and are comfortable for the wearer.

We claim:

1. A translating presbyopic contact lens comprising an optical zone, a peripheral zone around the optical zone and a pseudotruncation which is asymmetric about the vertical meridian and the radial position of the peak thickness value of the pseudotruncation at any meridian around the lens is substantially contstant, the arc being a portion of a concentric circle about the lens center and wherein the center circumference of the lens is not circular and not concentric about the lens center.

2. The contact lens of claim 1 wherein the pseudotruncation is comprised of a lenticular portion, bevel portion, flange portion, and the junctions between them.

3. The contact of lens of claim 1 wherein the pseudotruncation is substantially below the horizontal meridian of the lens and asymmetric around the vertical meridian.

4. The contact lens of claim 1 wherein the optical zone is asymmetric around the vertical meridian.

5. The contact lens of claim 1 wherein the pseudotruncation is rotated nasally up.

6. The contact lens of claim 5 wherein the pseudotruncation is rotated nasally up by between 1 to 15 degrees.

7. The contact lens of claim 5 wherein the pseudotruncation is rotated nasally up by between about 7 to 8 degrees.

8. The contact lens of claim 1 wherein the pseudotruncation is rotated nasally down.

9. The contact lens of claim 1 wherein the pseudotruncation is rotated nasally down by between about 1 to 10 degrees.

10. The contact lens of claim 1 wherein the pseudotruncation and optical zone are rotationally aligned substantially the same amount.

11. The contact lens of claim 1 wherein the pseudotruncation and optical zone are not rotationally aligned substantially at the same amount.

12. The contact lens of claim 1 wherein the optical zone is inset horizontally nasalward.

13. The contact lens of claim 1 wherein the optical zone is rotated nasally up.

14. The contact lens of claim 1 wherein the optical zone is inset horizontally nasalward and rotated nasally up.

15. The contact lens of claim 1 or 4 wherein the optical zone is inset horizontally nasalward and rotated nasally up and further moved up.

16. The contact lens of claim 1 wherein the pseudotruncation is comprised of a single elevated zone.

17. The contact lens of claim 1 wherein the pseudotruncation is comprised of more than one elevated zone.

18. The contact lens of claim 1 wherein the angular subtense of the pseudotruncation when it is 80% of its maximum thickness, is between 40 and 100 degrees circumferentially around the lens.

19. The contact lens of claim 1 wherein the pseudotruncation varies in height or circumferential angular subtense with changes in refractive prescription.

20. The contact lens of claim 1 wherein the pseudotruncation varies in height or circumferential angular subtense on a basis of data from an individual wearer.

21. The contact lens of claim 1 wherein the pseudotruncation varies in height or circumferential angular subtense on a basis of data from a population, sub-population, or group.

22. The contact lens of claim 1 wherein the width of the bevel portion is between about 50μ to about 500μ.

23. The contact lens of claim 1 wherein the position of the bevel flange junction is between about 5 to about 7 mm.

24. The contact lens of claim 1 wherein the maximum radial thickness of the lenticular bevel junction is between about 300μ to about 600 μ.

25. The contact lens of claim 1 wherein the thickness of the bevel flange junction is between about 75μ to about 250 μ.

* * * * *